United States Patent
Malemezian et al.

(10) Patent No.: US 10,375,349 B2
(45) Date of Patent: Aug. 6, 2019

(54) BRANCH DEVICE BANDWIDTH MANAGEMENT FOR VIDEO STREAMS

(71) Applicant: Synaptics Incorporated, San Jose, CA (US)

(72) Inventors: Bradley C. Malemezian, Atlanta, GA (US); Prashant Shamarao, Cupertino, CA (US); Jeffrey A. Lukanc, San Jose, CA (US); Jifeng Liu, Fremont, CA (US); Xuexin Liu, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/851,524

(22) Filed: Dec. 21, 2017

(65) Prior Publication Data

US 2018/0191996 A1    Jul. 5, 2018

Related U.S. Application Data

(60) Provisional application No. 62/441,652, filed on Jan. 3, 2017.

(51) Int. Cl.
| | |
|---|---|
| *H04N 7/01* | (2006.01) |
| *H04N 5/44* | (2011.01) |
| *H04N 5/04* | (2006.01) |
| *H04N 21/4363* | (2011.01) |
| *H04N 21/6373* | (2011.01) |
| *G06F 3/14* | (2006.01) |
| *G09G 5/00* | (2006.01) |

(52) U.S. Cl.
CPC .............. *H04N 7/01* (2013.01); *G06F 3/1423* (2013.01); *G09G 5/005* (2013.01); *H04N 5/04* (2013.01); *H04N 5/44* (2013.01); *H04N 21/43637* (2013.01); *H04N 21/6373* (2013.01); *G09G 2340/0435* (2013.01); *G09G 2350/00* (2013.01); *G09G 2370/04* (2013.01); *G09G 2370/042* (2013.01); *G09G 2370/16* (2013.01)

(58) Field of Classification Search
CPC ......... G09G 2370/16; G09G 2370/042; G09G 2350/00; G09G 2340/0435; G09G 2370/04; G09G 5/005; G06F 3/1423; H04N 7/01; H04N 21/43637; H04N 21/6373; H04N 5/04; H04N 5/44
See application file for complete search history.

(56) References Cited

U.S. PATENT DOCUMENTS

| | | | |
|---|---|---|---|
| 2006/0215630 A1* | 9/2006 | Hwang | H04L 12/1827 370/351 |
| 2010/0058205 A1* | 3/2010 | Vakil | G06F 1/1616 715/761 |
| 2010/0146527 A1* | 6/2010 | Craib | H04N 7/17318 725/5 |

(Continued)

*Primary Examiner* — Jefferey F Harold
*Assistant Examiner* — Humam M Satti
(74) *Attorney, Agent, or Firm* — Ferguson Braswell Fraser Kubasta PC

(57) ABSTRACT

Bandwidth management includes receiving, by a branch device, a requested display identification data structure from a display device. The branch device modifies the requested display identification data structure based on a total bandwidth through a constricted port on the branch device to obtain a modified display identification data structure. The branch device transmits the modified display identification data structure to a source device.

18 Claims, 6 Drawing Sheets

(56) References Cited

U.S. PATENT DOCUMENTS

| | | | | |
|---|---|---|---|---|
| 2011/0141351 A1* | 6/2011 | Yan | ................. | G09G 5/006 |
| | | | | 348/445 |
| 2011/0184965 A1* | 7/2011 | Kambhatla | ......... | H04L 65/4069 |
| | | | | 707/758 |
| 2011/0194619 A1* | 8/2011 | Yu | ................. | H04N 19/30 |
| | | | | 375/240.26 |
| 2013/0208075 A1* | 8/2013 | Lu | ................. | H04N 7/147 |
| | | | | 348/14.02 |
| 2015/0288919 A1* | 10/2015 | Labosco | ............ | H04N 19/44 |
| | | | | 348/445 |
| 2016/0142343 A1* | 5/2016 | Tongle | ............ | H04L 49/9057 |
| | | | | 370/474 |
| 2017/0104974 A1* | 4/2017 | Bak | ................. | H04N 11/28 |
| 2017/0134461 A1* | 5/2017 | Li | ................. | H04L 65/601 |
| 2017/0353748 A1* | 12/2017 | Van Dusen | .......... | H04N 21/234 |
| 2018/0074743 A1* | 3/2018 | Jeter | ................. | G06F 1/08 |

\* cited by examiner

BRANCH DEVICE BANDWIDTH MANAGEMENT FOR VIDEO STREAMS

CROSS-REFERENCE TO RELATED APPLICATIONS

This application is a non-provisional application of U.S. Provisional Patent Application Ser. No. 62/441,652, filed on Jan. 3, 2017. Accordingly, this application claims priority to U.S. Provisional Patent Application Ser. No. 62/441,652 under 35 U.S.C. § 119(e). U.S. Provisional Patent Application Ser. No. 62/441,652 is hereby incorporated by reference in its entirety.

FIELD OF THE INVENTION

Generally, embodiments of the invention relate to electronic devices. Specifically, embodiments relate to branch devices connecting to display devices.

BACKGROUND

A video stream is a collection of video signals that are for display on a display device. The video signals are a representation of visual images in the form of encoded digital data. Video streams are transferred from a source device that creates the video stream to a display device that displays the video stream. In order to ensure that the format of the video stream complies with the display requirements of the display device, the display device sends extended display identification data (EDID) to the source device. The source device creates the video stream to match the EDID and sends the video stream through a branch device to the display device. In particular, the branch device merely forwards the video stream to the display device.

SUMMARY

Some example embodiments are directed to a branch device for bandwidth management. The branch device includes a source device port, a display device port, and processing circuitry coupled to the source device port and the display device port. The processing circuitry is configured to receive, via the display device port, a requested display identification data structure from a display device, modify the requested display identification data structure based on a total bandwidth through a constricted port on the branch device to obtain a modified display identification data structure, and transmit the modified display identification data structure to the source device via the source device port.

Some example embodiments are directed to a method for bandwidth management. The method includes receiving, by a branch device, a requested display identification data structure from a display device. The branch device modifies the requested display identification data structure based on a total bandwidth through a constricted port on the branch device to obtain a modified display identification data structure. The branch device transmits the modified display identification data structure to a source device.

Some example embodiments are directed to a video stream processing architecture coupled to a source device port and a display device port. The video stream processing architecture comprising circuitry for receiving, via the source device port from a source device, an original video stream matching a modified display identification data structure, and modifying the original video stream to create a requested video stream matching a requested display identification data structure. The requested display identification data structure is requested by a display device. The requested video stream is transmitted via the display device port to the display device.

Other aspects of the technology will be apparent from the following description and the appended claims.

DETAILED DESCRIPTION

Figure 1:
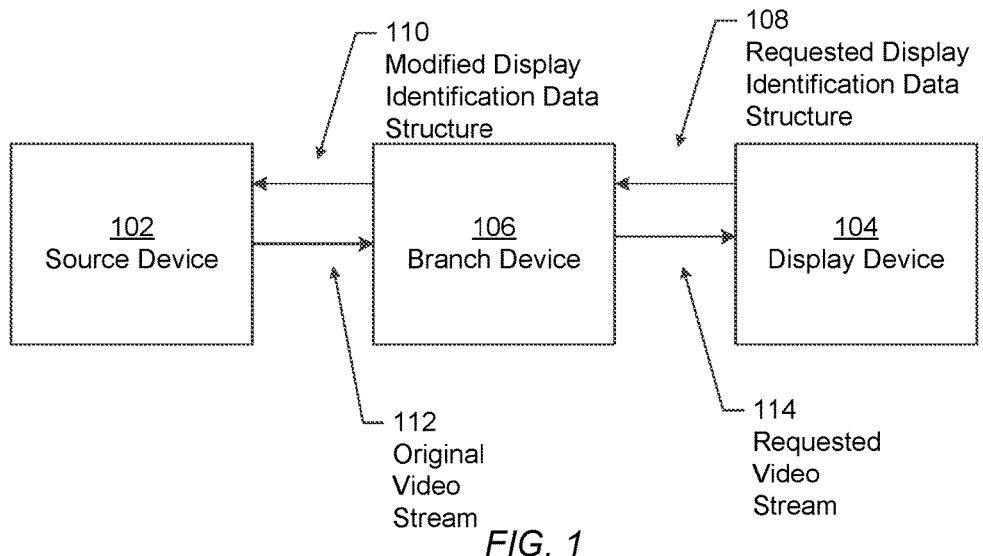
FIG. 1 shows a diagram of a system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to branch device bandwidth management for video streams. In particular, the branch device couples one or more source devices to one or more display devices to transfer video streams from the source device(s) to the display device(s). The branch device may have bandwidth limitations at a constricted port of the branch device. In order to handle the bandwidth limitations, the branch device modifies a display identification data structure from the display device to reduce the bandwidth requirements through the constricted port. When a video stream is received that matches the modified display identification data structure, the branch device may modify the video stream such that the video stream complies with the display identification data structure requested by the display device. In one or more embodiments, the modification of the display identification data structure and video stream is performed so as to preserve the quality of the video stream. In particular, in contrast to performing bandwidth management for the branch device on the source device, the quality of the video stream to the display device is the same as if the modifications were not made and no bandwidth management for the branch device were performed.

As used herein, a video stream is a collection of video signals. In particular, the video stream is a representation of visual images in the form of encoded digital data. The objects in the visual images may appear stationary, such as in the case of presentations, documents, etc., or in motion, such as in the case of movies and other videos. Thus, the use of the term video is not in reference to the content, but rather in reference to the display being visual. By way of a more specific example, the video stream may comply with DTV Interface Standards by the DTV Interface Subcommittee of the Computer Technology Association.

The video signals may include signals for displayable data and filler data. The displayable data describes how to display the video image at the display device. For example, the displayable data in the video stream may describe the color value of each physical pixel of the display. The filler data in the video stream is data that has values which do not matter, but act as placeholders for the purposes of maintaining proper timing. An example of filler data is data transmitted for the horizontal blanking period.

Turning to the figures, FIG. 1 shows a diagram of a system in accordance with one or more embodiments of the technology. As shown in FIG. 1, the system includes a display device (104) coupled to a source device (102) via a branch device (106). Coupling includes both direct and indirect connection between respective components. Each of these devices are described below.

A display device (104) is a physical device that displays a video stream. For example, the display device may be a standalone monitor, a monitor of a laptop, a projector, television, screen of a mobile device, head mounted display, or other physical device that is capable of showing the video stream.

A source device (102) is a physical device that generates and outputs video content. In other words, the source device (102) renders content from internal data to the external interface. The source device may include or may be a graphics processor, central processing unit, or other circuitry for creating the video stream. For example, a source device may be a computer, television, digital video disc (DVD) player device, Blu-Ray player, all or part of a mobile device, or another such device.

A branch device (106) is interposed between and coupled to both the display device (104) and the source device (102). Coupled refers to a direct or indirect physical connection between the branch device (106) and display device (104) and between the branch device (106) and source device (102). In one or more embodiments, the display device (104) and the source device (102) are both physically and wired or wirelessly connected to the branch device (106) via physical ports on the branch device (106). For example, a wireless chip, which transports the content wirelessly from the source device to the branch device, may exist between the source device and the branch device. The branch device (106) takes external input interface content and transports the content to an external output interface. For example, the branch device (106) may be a docking station (e.g., for a laptop or mobile device), cable having a splitter, or other such device that forwards a video stream.

As further shown in FIG. 1, a requested display identification data structure (108) is communicated from the display device (104) to the branch device (106). The requested display identification data structure (108) is the display identification data structure with the parameters set by the display device (104). The use of the term display identification data structure corresponds to the standard use of display identification data structure in the art. In other words, the display identification data structure is a data structure provided by a digital display to describe the digital display's capabilities to a video source. The display identification data structure may include manufacturer name and serial number, product type, timing supported by the display, display size, supported resolutions, and various other information. More particularly, the requested display identification data structure specifies the formatting of the video stream as required by the display device (104). The display identification data structure may be an extended display identification data (EDID). An EDID complies with any version of the EDID standard defined by Video Electronics Standards Association. The EDID may be an enhanced EDID (e.g., E-EDID) in some embodiments.

A modified display identification data structure (110) is communicated from the branch device (106) to the source device (102). The modified display identification data structure (110) is a display identification data structure that is modified by the branch device (106). In particular, the modified display identification data structure (110) has one or more parameters for the video stream that are different than the original display identification data structure (108). For example, the modified display identification data structure (110) may have a different value for the horizontal blanking than the requested display identification data structure (108), a different value for the vertical blanking than the requested display identification data structure (108), a different value for the clock rate than the requested display identification data structure (108), or another parameter value that is different than the requested display identification data structure (108).

Continuing with FIG. 1, an original video stream (112) is a video stream that is output of the source device (102). In particular, video signals of the original video stream (112) is as transmitted from the source device (102) to the display device (104). The original video stream (112) complies with the modified display identification data structure (110).

The requested video stream (114) is a video stream as requested by the display device (104). The requested video stream (114) complies with the requested display identification data structure (108). Thus, the requested video stream (114) is different than the original video stream (112) with respect to at least one property.

Figure 2:
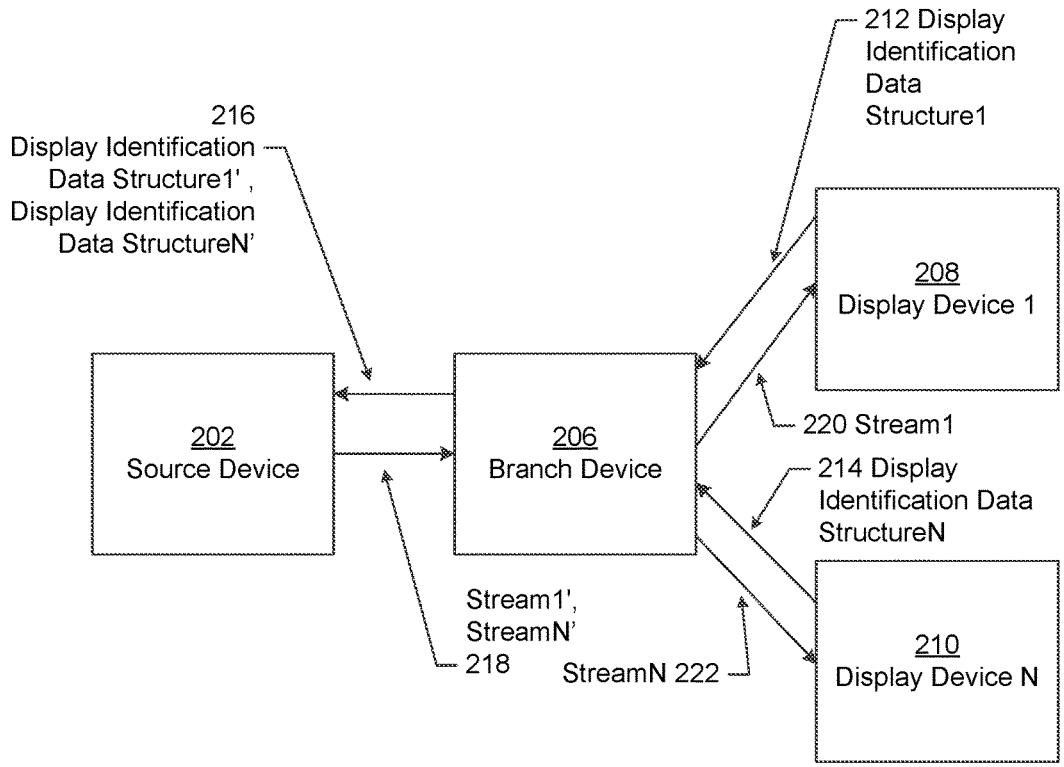
FIG. 2 shows a diagram of a system in accordance with one or more embodiments of the technology.

FIG. 2 show another configuration of a system in accordance with one or more embodiments of the technology. As shown in FIG. 2, the system may include multiple display devices (e.g., display device 1 (208), display device N (210)) connected via a branch device (206) to a source device (202). Each display device (e.g., display device 1 (208), display device N (210)) may have a corresponding requested display identification data structure (e.g., display identification data structure1 (212), display identification data structureN (214)) and corresponding modified display identification data structure (e.g., display identification data structure1', display identification data structureN' (216)). Each display device (e.g., display device 1 (208), display device N (210)) may additionally have a corresponding original video stream (e.g., stream1', streamN' (218)) and corresponding requested video stream (e.g., stream (220), stream N (222)). The source device, branch device, display device, requested display identification data structure, modified display identification data structure, original video streams, and modified video streams of FIG. 2 may be the same or similar to the corresponding like named components in FIG. 1. Each display device may have the same or different requested display identification data structure. For example, display identification data structure 1 (212) may be the same or different than display identification data structureN (214).

As shown in FIG. 2, each display device (e.g., display device 1 (208), display device N (210)) has a separate connection from other display devices to the branch device (206). Further, as shown in FIG. 2, content, such as the modified display identification data structure (e.g., display identification data structure1', display identification data structureN' (216)) and original video stream (e.g., stream1', streamN' (218)) for each display device share a single connection or port between the branch device (206) and source device (202). The single connection may have insufficient bandwidth to receive the requested video streams for all display devices. However, by the branch device requesting a video stream without filler data and the branch device adding in the filler data, the limited bandwidth of the single connection may be sufficient without losing the quality of the display.

Although not shown in FIGS. 1 and 2, multiple source devices may be coupled to the same branch device. In such a scenario, a single display device or multiple display device may be connected to the branch device. Further, when multiple source devices are connected to the display device, each source device may provide an original video stream for a portion of the display. In one or more embodiments, the branch device may not combine the video stream into a single video stream, but rather keep the video streams as separate. Combining video streams may be performed, for example, on the display device.

Figure 3:
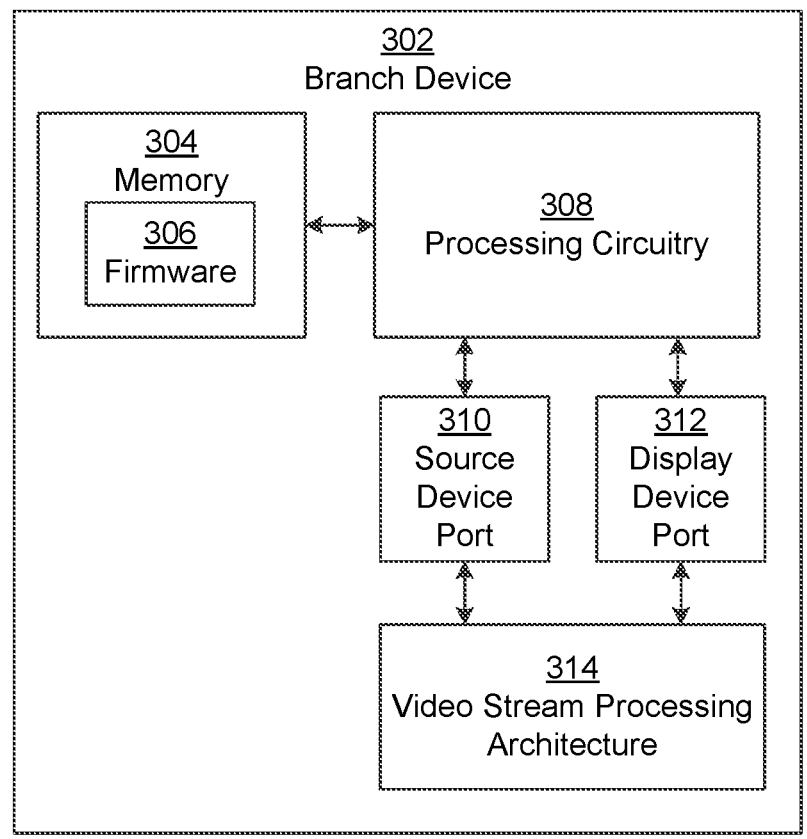
FIG. 3 shows a diagram of a branch device in accordance with one or more embodiments of the technology.

Continuing with the discussion of the branch device, FIG. 3 shows an example diagram of a branch device (302). The branch device (302) may be the branch device (106) in FIG. 1, branch device (206) in FIG. 2, or another branch device that is connected to multiple sources. As shown in FIG. 3, the branch device (302) includes source device port (310), display device port (312), memory (304) storing firmware (306), processing circuitry (308), and video stream processing architecture (314).

The source device port (310) is a physical hardware port that attaches to the source device (discussed above with reference to FIG. 1 and FIG. 2). For example, the source device port (310) may be a socket or plug that physically connects to the corresponding physical hardware port on the source device. The source device port (310) may comply with any display interface standard, such as DisplayPort Interface, High-Definition Multimedia Interface (HDMI), Mobile Industry Processor Interface (MIPI), or Digital Visual Interface (DVI).

The display device port (312) is a physical hardware port that attaches to the display device (discussed above with reference to FIG. 1 and FIG. 2). For example, the display device port (312) may be a socket or plug that physically connects to the corresponding physical hardware port on the display device. The display device port (312) may comply with any display interface standard, such as DisplayPort Interface, HDMI, MIPI, or DVI. Further, the interface standard of the display device port (312) may be the same or different than the interface standard of the source device port (310).

Although FIG. 3 shows a single source device port (310) and a single display device port (312), multiple source device ports and/or multiple display device ports may exist. Specifically, each source device and each display device may have a separate source device port and display device port. Further, either or both the source device port (310) and the display device port (312) may be a constricted port. A constricted port is a physical hardware port with limited bandwidth. For example, the constricted port may have insufficient bandwidth for the requested video stream.

In one or more embodiments, any combination of source device and display device protocols may be supported by the branch device. One or more embodiments are protocol agnostic. Thus, any combination of source and sink protocols and versions can be supported including DisplayPort (DP), HDMI, DVI, MIPI, and VGA. The following example combinations of source devices, ports, and display devices that may be used. In a first example, a DP 1.2-1.4 source device in multi-stream transport (MST) mode may connect to a source device port on the branch device, and the branch device may have one or more DP and/or HDMI ports for connecting to corresponding DP and/or HDMI display devices. In another example, a DP 1.2-1.4 source device in MST mode may connect to a source device port on the branch device, and the branch device may have one or more MIPI ports for connecting to corresponding MIPI display devices. In another example, a DP 1.2-1.4 source device in single stream transport (SST) mode may connect to a source device port on the branch device, and the branch device may have one or more DP and/or HDMI ports for connecting to corresponding DP and/or HDMI display devices. In another example, a non-DisplayPort source device, such as an HDMI or DVI source, may connect to a source device port on the branch device, and the branch device may have one or more DP and/or HDMI ports for corresponding DP and/or HDMI display devices. The display device may be an HDMI/DVI monitor or television, which utilize VIC codes in the corresponding display identification data structures. To use the VIC codes, the branch device may modify the display identification data structure to change from VIC code to a more detailed timing as supported with DP display devices in order to create the desired video timing modifications. Other configurations of ports and protocols may be used.

Continuing with FIG. 3, memory (304) is a storage device. The memory (304) includes functionality to store firmware (306). Amongst other instructions, the firmware (306) includes instructions for modifying a display identification data structure. In particular, the firmware (306) includes instructions for performing the operations of FIG. 5. Although not shown, the firmware may further be stored in the form of computer readable program code. The computer readable program code may be stored, in whole or in part, temporarily or permanently, on a non-transitory computer readable medium such as a CD, DVD, storage device, a diskette, a tape, flash memory, physical memory, or any other computer readable storage medium.

The processing circuitry (308) is a hardware processor or portion thereof that includes functionality to retrieve and execute the firmware (306). For example, the processing circuitry (308) may be an embedded processor of the branch device (302). Although FIG. 3 shows processing circuitry (308) connected to firmware (306), the processing circuitry (308) may be dedicated hardware that is configured to perform the steps of FIG. 5 without firmware (306).

A video stream processing architecture (314) is hardware, software, and/or firmware for processing the original video stream to create the requested video stream. For example, the video stream processing architecture (314) may be implemented in firmware. In some embodiments, the video stream processing architecture is implemented as instructions to general purpose processing circuitry. In some embodiments, the video stream processing architecture is dedicated hardware circuitry that includes functionality to modify a video stream. An example of video stream processing architecture (314) is described below in reference to FIG. 4.

Additional components of the branch device (302) may exist that are not shown. The additional components may include functionality to route signals from the source device port (310) and/or display device port (312) to the processing circuitry (308) or video stream processing architecture (314) depending on the content in the signal or the direction of the signal. For example, input signals to the branch device (302) on the display device port (312) may be routed to the processing circuitry (308), while input signals to the branch device (302) on the source device port (310) may be routed to the video stream processing architecture (314).

Figure 4:
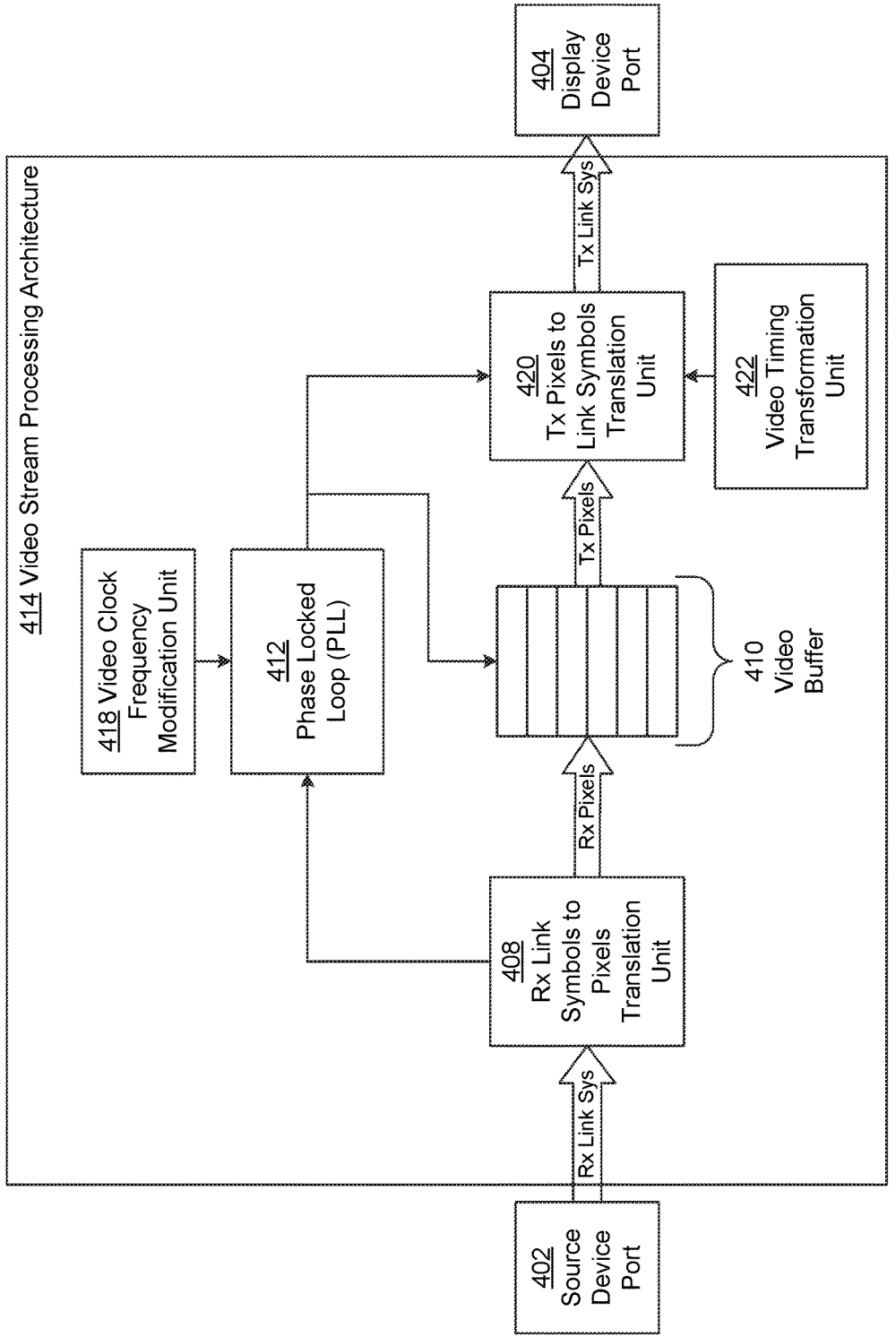
FIG. 4 shows a diagram of video stream processing architecture in accordance with one or more embodiments of the technology.

FIG. 4 shows an example diagram of video stream processing architecture (414) in accordance with one or more embodiments of the technology. Each component of the video stream processing architecture (414) may correspond to hardware circuitry in some embodiments. As shown in FIG. 4, the video stream processing architecture (414) is connected to at least one source device port (402) for input and to at least one display device port (404) for output. The source device port (402) and display device port (404) are the same or similar to the ports discussed above with reference to FIG. 3.

Input via the source device port (402) is passed as link symbols to a receive (Rx) link symbols to pixel translation unit (408). Link symbols include the symbol data, which is transmitted over the external link interface. The Rx link symbols to pixel translation unit (408) receives the incoming video signals and interprets the pixel values for the incoming video signals. The Rx link symbols to pixel translation unit (408) stores the pixel values in the video buffer (410). The video buffer (410) may be a hardware storage for temporarily storing pixel values. The Rx link symbols to pixel translation unit (408) further triggers a phase locked loop (PLL) (412) for managing the video timing as the video frequency clock. The PLL (412) is a fractional-N (Frac-N) PLL in one or more embodiments.

A video clock frequency modification unit (418) is coupled to the PLL (412) and is configured to increase the video clock frequency to match the requested display identification data structure. The video clock frequency modification unit (418) may be implemented in hardware circuitry and configured to tune the PLL (412). The PLL (412) is coupled to the video buffer (410) and the transmission (Tx) pixels to link symbols translation unit (420). More particularly, the output signals of the PLL (412) goes to the video buffer (410) and/or the Tx pixels to link symbols translation unit (420).

The Tx pixels to link symbols translation unit (420) translates the pixel stream to a signal stream for transmission on the display device port (404) to the display device. During translation, the video timing may be modified by the video timing transformation unit (422). For example, the video timing transformation unit (422) adds filler data in the form of blank pixels to the video stream to adjust the video timing. Thus, the video timing transformation unit (422) adds in the pixels to adjust the video timing for the horizontal and/or vertical blanking period per the requested display identification data structure. When only pixels for the blanking period are added, the quality of the output video is unaffected.

Although not shown in FIG. 4, in one or more embodiments, the video clock frequency modification unit (418) and video timing transformation unit (422) are coupled to the processing circuitry of FIG. 3. In such embodiments, the processing circuitry of FIG. 3 includes functionality to configure the video clock frequency modification unit (418) and video timing transformation unit (422) to restore an original video stream to match the requested video stream.

While FIGS. 1-4 show various configurations of components, other configurations may be used without departing from the scope of the technology. For example, various components may be combined to create a single component. As another example, the functionality performed by a single component may be performed by two or more components.

Figure 5:
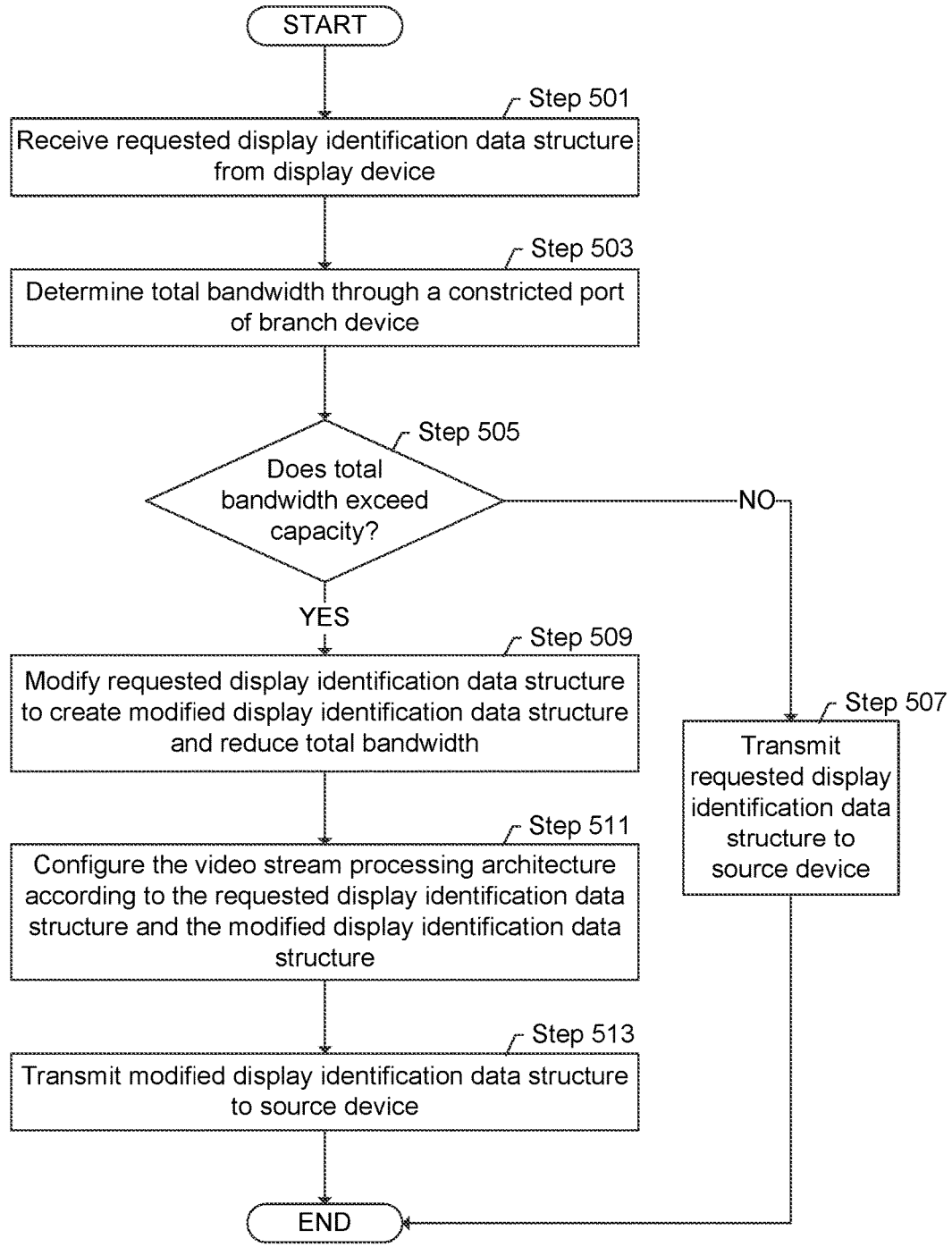
FIG. 5 shows a flowchart for modifying a display identification data structure in accordance with one or more embodiments of the technology.
Figure 6:
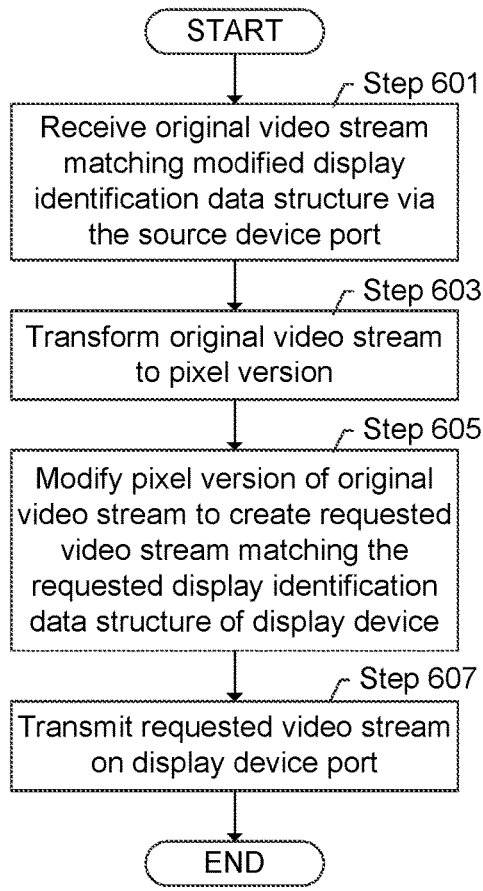
FIG. 6 shows a flowchart for transmitting a video stream in accordance with one or more embodiments of the technology.
Figure 7:
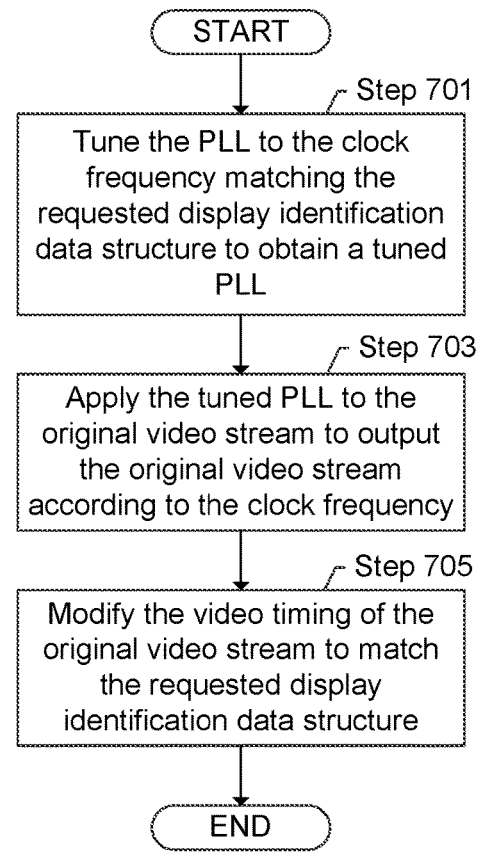
FIG. 7 shows a flowchart for modifying a video stream in accordance with one or more embodiments of the technology.

FIGS. 5-7 show flowcharts in accordance with one or more embodiments of the technology. While the various steps in these flowcharts are presented and described sequentially, some or all of the steps may be executed in different order, may be combined or omitted, and some or all of the steps may be executed in parallel. Furthermore, the steps may be performed actively or passively. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 5 shows a flowchart for the branch device to modifying a display identification data structure in accordance with one or more embodiments of the technology. As shown in FIG. 5, in Step 501, a requested display identification data structure is received from the display device.

Before sending out the video streams, the source device may send messages through the branch device to the connected display devices requesting the display identification data structures of the display devices. When the display devices respond and send the display identification data structure to the branch device, the display devices respond via the branch device. The branch device receives the requested display identification data structure via the display device port on the branch device. Rather than forwarding the requested display identification data structure to the source device, the branch device processing circuitry intercepts and examines the requested display identification data structure.

In Step 503, the branch device determines the total bandwidth through a constricted port of the branch device. In one or more embodiments, the branch device may determine the amount of bandwidth usage through each port of the branch device. In one or more embodiments, the branch device may only determine the amount of bandwidth usage through a subset of ports of the branch device. For example, the ports are considered constricted ports and are, thus, in the subset, may be a pre-configuration of the branch device. For example, the processing circuitry of the branch device may be preconfigured with the maximum bandwidth capacity of each constricted port. In one or more embodiments, the bandwidth usage may be calculated as the number of horizontal pixels (including blank pixels) multiplied by the number of vertical pixels (including blank pixels) multiplied by the pixel color depth multiplied by the frame rate. Thus, a 1920 by 1080 pixel display with 24-bit pixel depth running at 150 frames per second has approximately 150 Mbytes/sec bandwidth usage.

In one or more embodiments, determining the total bandwidth includes aggregating the bandwidth usage across each display device and/or source device that shares the constricted port. For example, the aggregation may be a simple sum of the bandwidth usage of each display device.

In Step 505, a determination is made whether the total bandwidth exceeds capacity of the constricted port. If the total bandwidth does not exceed capacity of the constricted port, then the requested display identification data structure is transmitted to the source device in Step 507. The flow may then proceed to end. If the total bandwidth exceeds capacity, then the flow may proceed to Step 509.

In Step 509, the requested display identification data structure is modified to create a modified display identification data structure and to reduce the total bandwidth. In particular, the processing circuitry adjusts the values of one or more parameters in the video stream to reduce the total bandwidth. For example, the processing circuitry may reduce the parameter values for the video stream clock and the horizontal blanking period. In the example, the processing circuitry may not modify the parameter values of the refresh rate and the line time. By reducing the parameter values for the video stream clock and the horizontal blanking period while keeping the refresh rate and line time constant, the branch device maintains the higher refresh rate while reducing bandwidth usage.

By way of another example, the processing circuitry may reduce the parameter value for the video stream clock, which will also reduce the refresh rate. In the second example, the modification of the display identification data structure is simpler and only a small frame rate reduction may result (e.g., 58 Hertz (Hz) instead of 60 Hz).

If the processing circuitry is connected to multiple display devices, the processing circuitry may concurrently modify the requested display identification data structure of the multiple display devices to reduce the total bandwidth. For example, consider the scenario in which a first display device is connected to the source device via the branch device. When connected, the first display device sends a first requested display identification data structure to the branch device. The branch device determines that the total bandwidth usage of the first display device complies with the constricted port and sends the requested display identification data structure to the source device. Subsequently, a second display device is connected to the source device via the branch device. The second display device then sends a second requested display identification data structure to the branch device for transmission to the source device. The branch device may then determine that the second requested display identification data structure with the first requested display identification data structure exceeds capacity. In such a scenario, the branch device may modify the second requested display identification data structure to reduce the total bandwidth usage and send the modified display identification data structure to the source device. In some embodiments, concurrently (e.g., in parallel or in serial), the branch device may also adjust the first requested display identification data structure to create another modified display identification data structure, which is sent to the source device. Thus, in such embodiments, both the first requested display identification data structure and the second requested display identification data structure are modified. In some embodiments, only the second requested display identification data structure is modified.

Continuing with FIG. 5, in Step 511, the video stream processing architecture is configured according to the requested display identification data structure and the modified display identification data structure. Configuring the video stream processing architecture includes adjusting the components of the video stream processing architecture to modify the video stream in order to achieve the requested display identification data structure. For example, various stored tuning parameters may be adjusted on the video stream processing architecture.

In one or more embodiments, the components are configured to perform different modifications per display identification data structure modification. In other words, the type and amount of modification of the video stream is dependent on the video stream. By way of an example, if two display devices are connected to the same branch device, the video stream processing architecture may be configured differently for the first display device as compared to the second display device, such that the type and amount of modification of the video streams is different between the display devices.

In Step 513, the modified display identification data structure is transmitted to the source device. In particular, the modified display identification data structure may be transmitted on the source device port connected to the source device. To the source device, the modified display identification data structure is the only display identification data structure for the display device. Accordingly, the source device does not need to be modified to account for the bandwidth limitations on the branch device. The source device may merely operate as normal using the modified display identification data structure as the only display identification data structure for the display device.

When the source device receives the modified display identification data structure, the source device formats the video stream for the display device according to the modified display identification data structure. The source device sends the video stream via the branch device to the display device. FIG. 6 shows a flowchart for the branch device to transmit a video stream in accordance with one or more embodiments of the technology.

As shown in FIG. 6, the branch device receives an original video stream matching the modified display identification data structure via the source device port in Step 601. The original video stream is received as link symbols signals on the source device port and transmitted to the video stream processing architecture.

In Step 603, the original video stream is transformed to a pixel version. In one or more embodiments, to perform the modification, the video stream processing architecture breaks the video signals into pixel values for individual pixels.

In Step 605, the pixel version of the video stream is modified to create a requested video stream matching the requested display identification data structure of the display device. Buffering is performed on the branch device to manage the timing and allow for the modification. Performing the modification is described below in reference to FIG. 7.

In one or more embodiments, if multiple combined video streams are received from the source device for multiple branch devices, the multiple combined video streams are modified while the multiple combined video streams are separated into multiple separate video streams. In other words, if video signals are received concurrently for a first display device and a second display device, the video signals are partitioned into separate video streams concurrently with modifying the video streams to comply with the requested display identification data structures.

Continuing with FIG. 6, in Step 607, the requested video stream is transmitted on the display device port. The pixel version is transmitted as video signals via the display device port to the display device.

FIG. 7 shows a flowchart for modifying a video stream in accordance with one or more embodiments of the technology. In Step 701, the PLL is tuned to the clock frequency matching the requested display identification data structure to obtain a tuned PLL. In Step 703, the tuned PLL is applied to the original video stream to output the original video stream according to the clock frequency. Because of the buffering of the pixels in the video buffer, the pixels are output from the video buffer according to the timing of the tuned PLL. Thus, video streams arriving at a first clock frequency may be transmitted at the second clock frequency, whereby the second clock frequency complies with the requested display identification data structure.

In Step 705, the video timing of the original video stream is modified to match the requested display identification data structure. Additional filler data may be added to change the timing. Thus, the output to the display device may have the corrected blanking periods.

Figure 8:
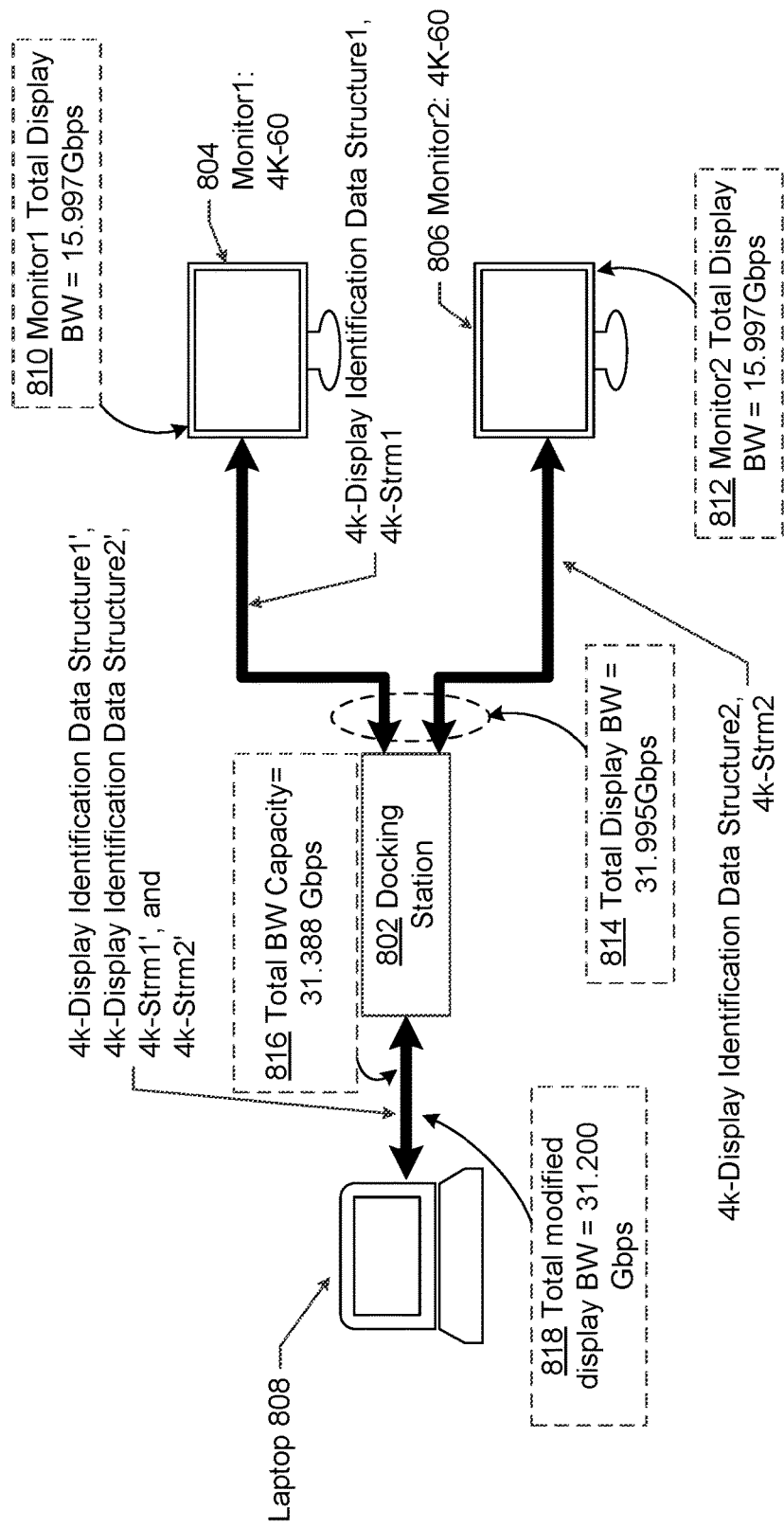
FIG. 8 shows an example in accordance with one or more embodiments of the technology.

FIG. 8 shows an example in accordance with one or more embodiments of the technology. The following example is for explanatory purposes only and not intended to limit the scope of the technology.

In the example, the branch device is a docking station (802) using a DisplayPort (DP) interface and driving two monitors (e.g., monitor1 (804), monitor2 (806)). The docking station (802) includes a management service layer that includes hardware, such as processing circuitry and video stream processing architecture, and software, such as firmware, for performing one or more embodiments of the technology. The docking station (802) may further be connected to a laptop (808) as the source device. The connection from the laptop (808) to the docking station (802) may be a DP connection in the example. The docking station (802) may further include a USB layer module for receiving an auxiliary ("AUX") and/or fast AUX ("FAUX") channel from the DP cable via the source device port and providing the AUX channel to USB hub. The USB hub may be used to connect to peripheral devices, such as a keyboard and mouse.

In the example, the laptop (808) is a DP 1.4 source device, and the two monitors (e.g., monitor1 (804), monitor2 (806)) support 4 k-60 Hz RGB 8 bits per component video. Thus, the bandwidth of each monitor individually is 15.997 Gbps as shown in dashed boxes (810, 812) of FIG. 8. Accordingly, the preferred maximum resolutions of the two monitors combined result in a bandwidth which can be calculated as follows: Tot_display_BW=2*BW (4 k-60 Hz RGB 8 bpc video)=31.995 Gbps as shown in box (814) of FIG. 8.

Continuing with the example, the source device port on the docking station (802) is 4-lanes of DP 1.4 running at high bit rate 3 (HBR3) link rate in MST mode. The usable bandwidth on the branch input port, when factoring in MST overhead, is only 31.388 Gbps as shown in box (816) of FIG. 8. Accordingly, the total display bandwidth of 31.995 Gbps is greater than the total source device port bandwidth of 31.388 Gbps. Without one or more embodiments described herein, the outputs to the monitors will need to be reduced in quality.

One or more embodiments may perform the following to reduce the bandwidth usage on the source device port without affecting quality. The docking station (802) receives the requested display identification data structure from each display device. The docking station (802) changes the pixel clock from 53325 to 52000 and the horizontal blanking period from 160 to 60. Thus, the 60-Hz refresh rate of each monitor is maintained.

When the source device receives the modified display identification data structures for both display devices, the source device produces original video streams having the following bandwidth usage on the source device port. The total modified display bandwidth is 2*BW (reduced display identification data structure 4 k-60 Hz RGB 8 bpc video) =31.200 Gbps as shown in box (818). The docking station (802) receives the original video streams having the total bandwidth usage of 31.200 Gbps, which will fit in the available bandwidth of 31.388 Gbps.

Before sending the video streams to the display device ports, the docking station reconstructs the blank timings as requested in requested display identification data structure (Pixel clock=53325 and Hblank=160). Thus, the modified video streams are exactly as the monitors have requested with no quality loss.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A branch device for bandwidth management, the branch device comprising:
 a source device port;
 a first display device port;
 processing circuitry coupled to the source device port and the display device port, the processing circuitry configured to:
  receive, via the first display device port, a first requested display identification data structure from a first display device,
  modify the first requested display identification data structure based on a total bandwidth through a constricted port on the branch device to obtain a modified display identification data structure, and
  transmit the modified display identification data structure to the source device via the source device port; and
 a video stream processing architecture coupled to the source device port and the first display device port, the video stream processing architecture configured to:
  receive, via the source device port, an original video stream,
   wherein the original video stream is modified, as defined by the modified display identification structure, in comparison to a requested video stream as defined by the first requested display identification data structure,
  modify the original video stream to create the requested video stream matching the first requested display identification data structure, and
  transmit the requested video stream via the first display device port.

2. The branch device of claim 1, wherein the constricted port is the source device port.

3. The branch device of claim 2, further comprising:
a second display device port coupled to the processing circuitry,
wherein the processing circuitry is further configured to:
aggregate, to obtain the total bandwidth, the first requested display identification data structure and a second requested display identification data structure, the second requested display identification data structure received through the second display device port from a second display device,
wherein the first requested display identification data structure is modified based on the total bandwidth exceeding capacity of the source device port.

4. The branch device of claim 1, wherein the constricted port is the first display device port.

5. The branch device of claim 4, wherein the branch device is coupled to a plurality of source devices, wherein the source device is in the plurality of source devices, and wherein each of the plurality of source devices provides a portion of a display on the first display device through the first display device port.

6. The branch device of claim 1, wherein the processing circuitry is further configured to:
configure the video stream processing architecture according to the original display identification data structure and the modified display identification data structure.

7. The branch device of claim 1, wherein the video stream processing architecture is further configured to:
transform the original video stream on the source device port to a pixel version, wherein the pixel version is modified to create the requested video stream.

8. The branch device of claim 1, wherein the video stream processing architecture comprises:
a phase-locked loop (PLL), and
a video clock frequency modification unit coupled to the PLL and configured to tune the PLL to a clock frequency matching the requested display identification data structure to obtain a tuned PLL, wherein the tuned PLL is applied to the original video stream according to the clock frequency to create the requested video stream.

9. The branch device of claim 1, further comprising:
a video timing transformation unit configured to:
modify a video timing of the original video stream to match the requested display identification data structure and create the requested video stream.

10. The branch device of claim 1, wherein the modified display identification data structure has a smaller horizontal blanking period and lower clock frequency than the requested display identification data structure, and wherein the video stream processing architecture is configured to increase the horizontal blanking period and the clock frequency in the original video stream to create the requested video stream.

11. The branch device of claim 1, wherein the modified display identification data structure has a lower clock frequency than the requested display identification data structure, and wherein the video stream processing architecture is configured to increase the clock frequency in the original video stream to create the requested video stream.

12. The branch device of claim 1, wherein the first display device port complies with at least one selected from a group consisting of DisplayPort Interface, High-Definition Multimedia Interface (HDMI), Mobile Industry Processor Interface (MIPI), and Digital Visual Interface (DVI).

13. The branch device of claim 1, wherein the first requested display identification data structure is an extended display identification data (EDID).

14. A method for bandwidth management, the method comprising:
receiving, by a branch device, a first requested display identification data structure from a first display device;
modifying, by the branch device, the first requested display identification data structure based on a total bandwidth through a constricted port on the branch device to obtain a modified display identification data structure;
transmitting, by the branch device, the modified display identification data structure to a source device;
receiving, via the source device port, an original video stream,
wherein the original video stream is modified, as defined by the modified display identification structure, in comparison to a requested video stream as defined by the first requested display identification data structure;
modifying the original video stream to create the requested video stream matching the first requested display identification data structure; and
transmitting the requested video stream via the first display device port.

15. The method of claim 14, further comprising:
aggregating, to obtain the total bandwidth, the first requested display identification data structure and a second requested display identification data structure, the second requested display identification data structure received from a second display device,
wherein the first requested display identification data structure is modified based on the total bandwidth exceeding capacity of a source device port connected to the source device.

16. The method of claim 14, further comprising:
transforming the original video stream on the source device port to a pixel version, wherein the pixel version is modified to create the requested video stream.

17. The method of claim 14, further comprising:
modifying a video timing of the original video stream to match the requested display identification data structure and create the requested video stream.

18. A video stream processing architecture coupled to a source device port and a display device port, the video stream processing architecture comprising circuitry for:
receiving, via the source device port from a source device, an original video stream,
wherein the original video stream is modified, as defined by a modified display identification structure, in comparison to a requested video stream as defined by a requested display identification data structure, and
wherein the modified display identification structure is obtained by modifying the requested display identification data structure received from a display device via the display device port,
wherein the modified display identification structure is transmitted to the source device via the source device port,
modifying the original video stream to create the requested video stream matching the requested display identification data structure; and
transmitting the requested video stream via the display device port to the display device.

* * * * *